Figures 1, 2:
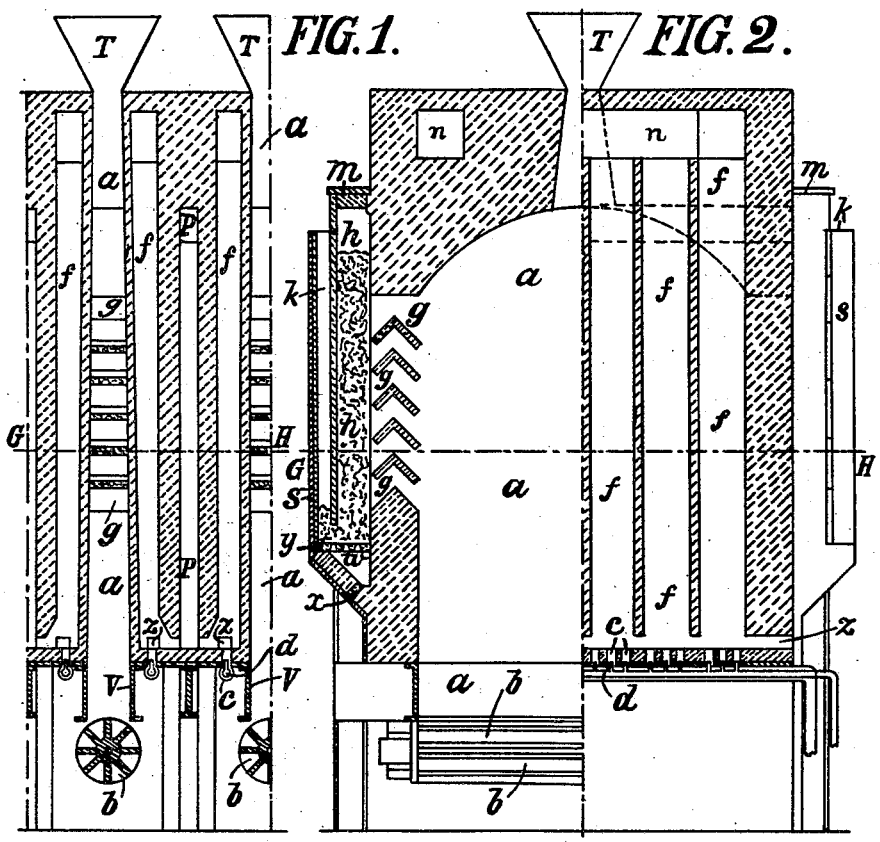

No. 830,283. PATENTED SEPT. 4, 1906.
J. ARMSTRONG.
APPARATUS FOR OBTAINING ZINC.
APPLICATION FILED SEPT. 20, 1905.

Witnesses
Inventor
John Armstrong
By Knight Bros
Associate Attys

UNITED STATES PATENT OFFICE.

JOHN ARMSTRONG, OF LONDON, ENGLAND.

APPARATUS FOR OBTAINING ZINC.

No. 830,283.　　　　Specification of Letters Patent.　　　　Patented Sept. 4, 1906.

Application filed September 20, 1905. Serial No. 279,500.

*To all whom it may concern:*

Be it known that I, JOHN ARMSTRONG, metallurgical engineer, a subject of the King of Great Britain, residing in London, E. C., in the Kingdom of England, have invented certain new and useful Improvements in Furnaces or Apparatus for Obtaining Zinc, (for which application has been made in Great Britain, No. 20,543, dated September 23, 1904,) of which the following is a specification.

This invention is for the purpose of extracting metallic zinc from ores or combinations containing it. Roasted zinc-blende may be treated by this method or calamine or other ore of zinc or of zinc in combination with lead or other metals. In any case the ore to be treated should be in the same state as is essential for its proper treatment by the ordinary retort process—that is, it should be oxidized and in powder form—so that the carbon mixed with it in the charge shall reduce it to the metallic state. This method differs from the old retort process in the following points, viz:

First. By this new method larger quantities can be treated at once, and denser metallic vapors can therefore be condensed with less loss in metallic oxid or poussiere. This latter consideration determines the percentage of zinc that can be with profit treated by the retort process—that is to say, unless an ore or mixture contains a certain quantity of zinc it cannot profitably be treated in retorts, one of the reasons being that the metallic vapors being so dilute and so poor do not condense into solid metal, but are condensed in the form of poussiere or zinc dust and oxid. By the present invention, on the other hand, any kind of poor ore can be treated.

Second. By the retort process the distillation is carried on through many hours. The metallic vapors thereby continue to become less dense in metal the longer the process is continued, so that the total metal in the ore is never wholly recovered, but is lost in the residues which remain behind in the retorts when the process is stopped and the charge is drawn. By this invention the process is continuous and at a very high temperature, so that all the metallic contents are thoroughly recovered in the metallic state.

Third. The distillation in retorts is carried on at a great cost in labor and fuel and refractory material forming the retorts. The heating and cooling periodically in charging and discharging occasions serious losses. By this new process no cooling takes place, economy in fuel and refractory material is the result, and a much higher temperature is maintained in the furnace during the process of distillation.

Fourth. Great difficulties are experienced in heating the retorts uniformly alike. The high temperature necessary for the rapid reduction of zinc oxid cannot be used in retorts; otherwise they would soften and melt. By this process the highest temperature can be applied and maintained, whereby zinc oxid can be rapidly reduced, thereby reducing the time of the distillation process and preventing the formation of silicate of oxid of zinc, thus further economizing fuel and standing charges, and it so augments the density of the metallic vapors that the loss in metal through the formation of oxid or poussiere is avoided.

Fifth. Retorts can only be made economically of certain refractory materials, chiefly fire-clay. Their life is therefore regulated by their quality and is usually of short duration. They often break and precipitate their contents into the furnace, causing trouble in the flues and loss of metal. The highest refractory substances—such as bauxite, dolomite, or silica—cannot be used, owing partly to the intermittent process entailing too great a change of temperature during the charging and discharging. By this new process silica and other highly-refractory materials can be used, and the highest temperature can be maintained without softening or melting damage occurring during the operation.

Sixth. Zinc ores containing lead cannot profitably be treated in retorts, because the lead oxid is not wholly reduced to the metallic state, but that portion which comes in contact with the walls of the retort forms lead silicate by the action of the atmosphere that is introduced when the retorts are discharged. This silicate of oxid of lead soon disintegrates the walls of the retorts and destroys them. By this new process lead up to any quantity in the ore can be treated, because there is never any oxidizing action in the furnace, the furnace being sealed against the atmosphere, and the contents being constantly in contact with carbon or CO gas the metal is never allowed to form oxids or silicates of oxids. It is reduced to the metallic state at once and kept so until it passes out of the furnace.

Seventh. By this process uniformity of temperature can be easily maintained. The cells are surrounded by the heating-flues, which are constantly kept at a high temperature by means of the apparatus and the arrangement subsequently described, the material operated upon gradually proceeding through the cells and approaching the highest temperature zone toward the end of the process, whereby the whole of the metallic contents are extracted.

The present invention is designed for the purpose of conducting the metallurgy of zinc without the use of retorts operating upon a large mass of material automatically and continuously, doing away with the intermittent system of charging and discharging small quantities of material in small retorts, the establishment of a continuous flow of metallic vapor into the condensers, the obtaining of a uniform temperature in the reducing zones of the chambers and also in the condensers, both of which can be regulated to any desired degree, and by so cheapening the *modus operandi* of the process that it will be possible to treat ores of a much poorer quality than is practicable at present, also the treatment of ores of zinc containing lead in quantity with or without other metals.

My invention is best set forth by describing the drawings of my working furnace.

Figure 4:
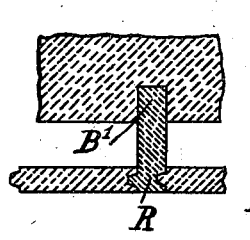
Figure 3:
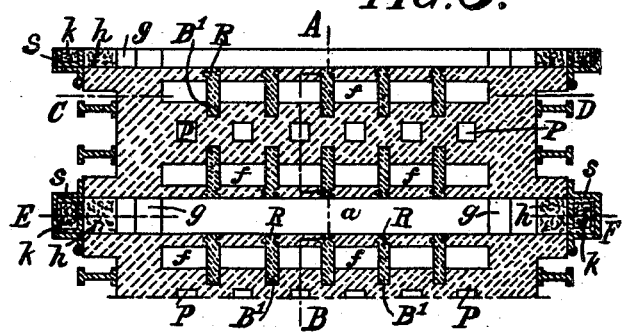

In the drawings, Figure 1 is a longitudinal sectional elevation of a row of chambers or cells, here shown as vertical in position through the line A B of Fig. 3. Fig. 2, left-hand side, is a section through the line E F, Figs. 1 and 3, and, right-hand side, section through C D, Figs. 1 and 3. Fig. 3 is a sectional plan through G H, Figs. 1 and 2. Fig. 4 shows details of brickwork of flues.

This furnace or apparatus is constructed with chambers or cells, here shown upright, (marked $a$ $a$ on plans and sections.) These are preferably made long, narrow, and high, comparatively, and are built with heating-flues around them for the purpose of heating them by means of gas from oil or coal or other kind of gas. They are formed with grooved and tongued bricks to insure an air-tight joint. The chambers are formed wider at the bottom than at the top, and the bricks separating the several heating-flues are made so that one end is built into the solid wall of the furnace at B' B', as shown, while the other end is tongued and grooved to take the brick R R, Fig. 3, which forms the inside of the cell or chamber. This is also tongued and grooved on its edges.

The cells or chambers are heated by gas that may be any kind of gas suitable for heating furnaces, which is conveyed to the furnace by the pipes $c$ $c$, Figs. 1 and 2. Air is also conveyed under pressure by the concentric tube $d$ $d$, which has jets projecting into the gas-burners. These primary air-jets force in the gas through the burners at a velocity which is entirely under control, as the air and gas are regulated in their flow through the pipes by stop-cocks for this purpose. By the action of the primary air in forcing the gas into the burners and up the heating-flues a partial vacuum is formed in the lower portion of the heating-flues, which causes a secondary supply of air to descend through the hot tubes or flues in the brickwork at P P and enter the combustion-flues $ff$, where it mixes with the gas, causing a very high temperature in the combustion-flues.

The cells or chambers are constructed in a row and are supported by buckstays on the outside and below by beams (marked V) to carry the floor. The cells are surmounted by a hopper T T for charging them. The charge passing through the chamber falls down upon the discharging apparatus $b$ $b$, which is rotated slowly at a rate requisite to continually discharge the exhausted residues, while a continuous supply of material is fed in at the hoppers T T. The region of greatest heat is toward the lower portion of the cell or chamber and just opposite and above the gas-burners. The cells or chambers being constantly filled with the charge, the latter gradually descends to this region of highest temperature, so that by the time the charge has arrived at the stage of partial exhaustion, which would be the final stage in the retort process, the charge is then acted upon by the highest temperature, where it parts with its last quota of metallic vapor. The vapors are given off and pass into the condenser $h$ through the gills $g$ $g$. The condenser $h$ $h$ is filled with coke, anthracite, or other carbonaceous material or charcoal by the lid $m$. Here the metallic vapors descend and are condensed into the metallic liquid state and percolate through the apertures in the bottom of the condenser, the carbon-monoxid gas passing under the baffle-wall up the tube $k$ $k$ and into the atmosphere or chimney or other flue or pipe for use. The flue $k$ $k$ is formed in the door $s$ $s$, which is hinged and made with close-fitting joints to exclude air and made so that it can be readily opened for cleaning purposes. The perforated bottom $y$ is also made movable. The metal condenses into the metallic liquid state in the chamber $w$ $w$, where it is collected and is tapped off periodically by the stoppered tube $x$. The pent-shaped baffles $g$ $g$ are made as shown to serve the double purpose of keeping the carbon on one side and the powdered charge on the other without mixing and of allowing free descent to both and a clear and uninterrupted path for the metallic vapors through them. The cells or chambers being continually full of the powdered charge up to the hopper at the top, an effectual seal is thus provided against the atmosphere entering the cells or chambers or condenser, there being constantly a plus pressure inside these parts.

The discharging apparatus consists of a cylinder divided into compartments which is supported upon trunnions which run in bearings at each end. Power is applied to the end to turn this cylinder very slowly round when the powdered residues are discharged automatically.

The cells or chambers being constructed narrow comparatively, the intense heat penetrates the charge in a manner hitherto unattained, whereby dense metallic vapors are constantly evolved, giving a steady and regular metallic condensation without the inevitable loss in poussiere and oxid by the old method.

When a row of cells or chambers is erected together, the gas may be manufactured in one or more of the cells without a separate producer, and the gas can be either the rich hydrocarbon gas from the distillation of coal or that mixed with hydrogen and carbon monoxid if steam is applied to the bottom of the cell or the gas manufactured from oil in the cell or gas may be obtained through a separate pipe from an extraneous supply.

The products of combustion are conducted away by the horizontal flues $n$ $n$ to any convenient chimney or stack or they may be simply discharged direct into the atmosphere at the surface of the roof of the furnace.

Inspection holes or flues are provided at $z$ $z$ for the purpose of judging the proper quantity of air and gas and also for inserting a rod or rake for clearing the bottom of the flues of combustion. These are closed with proper air-tight doors.

In conclusion it will be noticed that the chambers are built not merely comparatively narrow, but somewhat inclined on the inside face, so as to facilitate the descent of the materials operated upon. Sufficient depth is arranged for between the outlet for the metallic gases into the condenser and the feeding-door at the top to insure a perfect seal to the atmosphere, also sufficient depth is left at bottom between the heated flue and the discharger $b$ to form a seal and to enable the residue to cool to a "black heat" or thereabout before being discharged unless the discharge takes place at once into a furnace for separating the lead. The divisions between the gas flues and retorts are made of thin bricks or blocks with locking-joints substantially as depicted in Fig. 4. The condensers are preferably loosely packed with charcoal or coke in pieces some inches in diameter.

This furnace is well adapted also for the treatment of zinciferous ores containing lead and silver and other metals well known under the designation "composite" ores. Having no bottom and the air being excluded from the chamber, the lead has no opportunity to oxidize and injure the interior, as is the case when this is performed by means of retorts.

The lead is reduced by the carbon present to the metallic state and can be easily recovered from the residues, or when an air-seal-discharging device is used it can be collected in a sump at the bottom of the chamber and tapped out from time to time. When, however, zinciferous ores are treated containing lead, an excess of carbon must be used in the mixture,—first for the purpose of reduction and, second, for the purpose of keeping the chambers open and preventing agglomeration or massing in the interior of the residues when ores are treated rich in lead.

The waste heat and consumed gases are led away from the furnace and are used for raising steam or for roasting ores or other useful purpose. The carbon-monoxid gas given off from the condensers may also be collected and used as fuel for heating the chambers or be mixed with the gas used for this purpose.

I declare that what I claim is—

1. In furnaces for obtaining zinc, the combination of narrow deep reducing-chambers open at top and bottom, formed with thin walls nearly surrounded by flues, with an air-seal-feeding device at the top and an air-seal-discharge device below, substantially as described.

2. In a furnace or apparatus for obtaining zinc, the combination of a long high narrow reducing-chamber, means for having a continuous or substantially continuous feed at the top a discharge apparatus at bottom, both feed and discharge constructed of sufficient height to form air seals.

3. In an apparatus for obtaining zinc, the combination of a long narrow deep reducing-chamber open at top and bottom, means for keeping the same filled at top, a discharging device at bottom, a series of flues surrounding the same and means for injecting air and gas one of them being under pressure into the lower part of the flues.

4. The combination of a high narrow reducing-chamber heating-flues surrounding the same, and air-flues contiguous to the heating-flues, an opening for the admission of air to the air-flues at the top and an opening for the exit of the air at the bottom into the heating-flues and air and gas injection under pressure at the bottom of the heating-flues, substantially as described.

5. In a furnace or apparatus for obtaining zinc, the combination of a high narrow reducing-chamber, heating-flues on each side, heated by air and gas injection, and means for introducing secondary air into the flue just above the injectors.

6. In apparatus for obtaining zinc, the combination of a high reducing-chamber, a condensing-chamber largely filled with pieces of carbon placed alongside the reducing-chamber, a series of baffles or ducts sloping downward to both chambers connecting the same, a well at the bottom of the condensing-chamber, and an exit-pipe for the spent vapor substantially as described.

7. In apparatus for obtaining zinc, the combination of the reducing-chamber, and a condensing-chamber, baffling-passages between them, and a door formed in one piece with the condensing-chamber, having an exit-pipe from the chamber in said door, substantially as described.

8. In an apparatus or furnace for obtaining zinc from ores containing large quantities of lead and other metals, a device for distilling off the zinc first, and a cooling-chamber formed of metal sealed below from the atmosphere, whereby the remainder of the charge is cooled sufficiently before discharge to prevent oxidation of the lead contained therein.

9. In an apparatus for obtaining zinc, a long high reducing-chamber, means for keeping it constantly full at the top, and thus forming an air seal, and a continuation of said chamber forming a cooling-chamber, and an air seal at the bottom with a device for extracting the residues without material admission of air, substantially as described.

10. In an apparatus for obtaining zinc, a high narrow reducing-chamber with means for feeding the same at top and at the same time sealing it from the air, means for discharging it at the bottom with an air seal, the said chamber being made slightly tapered so as to be wider at the bottom than at the top and extending in depth and height beyond the heating-flues whereby the material easily descends and is cooler at the top and bottom than at the intermediate zone of reduction.

In witness whereof I have hereunto signed my name, this 5th day of September, 1905, in the presence of two subscribing witnesses.

JOHN ARMSTRONG.

Witnesses:
  A. NUTTING,
  H. D. JAMESON.